United States Patent Office.

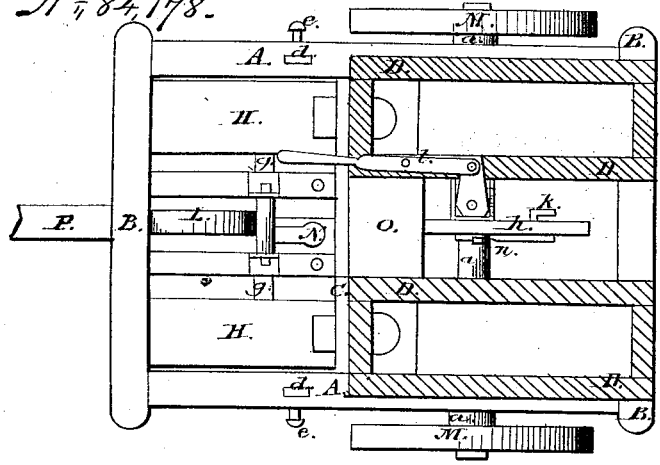
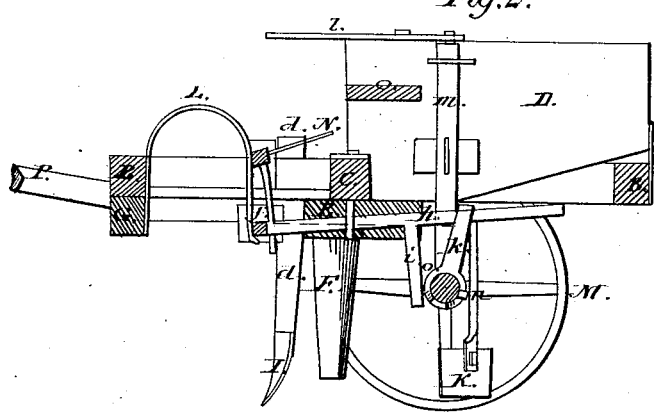
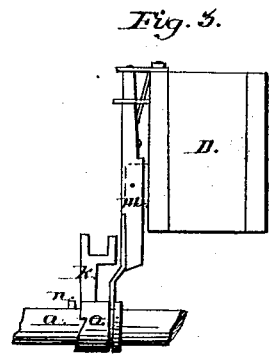
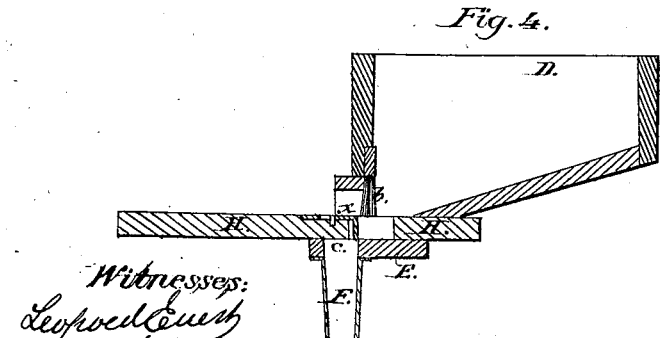

SNYDER FILSON AND WILLIAM E. KINERT, OF BLUFFTON, INDIANA.

Letters Patent No. 84,178, dated November 17, 1868.

IMPROVEMENT IN CORN-PLANTERS.

The Schedule referred to in these Letters Patent and making part of the same.

*To all whom it may concern:*

Be it known that we, SNYDER FILSON and WILLIAM E. KINERT, of Bluffton, in the county of Wells, and in the State of Indiana, have invented certain new and useful Improvements in Corn-Planters and Cultivators; and do hereby declare that the following is a full, clear, and exact description thereof, reference being had to the accompanying drawings, and to the letters of reference marked thereon.

The nature of our invention consists in the construction of a corn-planter, which is provided with adjustable plows and scrapers, and so arranged that the slides are operated by the turning of the axle, or by the operator, by means of a treadle, as may be desired; and also, in that it acts as a cultivator as well as a planter.

In order to enable others skilled in the art to make and use our invention, we will now proceed to describe its construction and operation, referring to the annexed drawings, which form a part of this specification, and in which—

Figure 1 is a plan view;

Figures 2 and 4, side sections; and

Figure 3, a rear view of the device for moving the slides.

A A represent two side rails, which, with the end rails B B, form a frame, which frame may be of any dimensions desired.

On the lower side of the side rails A A, are two pieces of wood, extending downward, which pieces rest on the axle $a$, said axle being enclosed by a metal stirrup from the lower end of these pieces.

One of the wheels, M M, is securely fixed on the end of the shaft $a$, either by key or otherwise, so that the axle rotates with the wheel.

A third short rail, C, is framed into the side rails, just forward of the axle, which serves to firmly fasten the side rails together, and also supports the forward end of the boxes D D, which contain the corn.

To the back part of this rail C the brushes $b\ b$ are attached, as shown in fig. 4.

Immediately below this rail, and attached to it and to the side rails by bolts or screws, are two blocks or pieces of timber E E, each having a gain or groove cut in it. In the bottom of said gain, and near the front edge, an opening, $c$, is made, for the passage of the corn into the tubes F F, which may be made of rubber, tin, or any other suitable material, and fastened to the blocks aforesaid, extending downwards towards the ground.

Immediately under the front rail B, and secured by bolts or screws, is another rail, G, which has gains, similar to those in the blocks E E, cut in it. Into these and the before-mentioned gains, the slides H H are inserted, said slides being provided on their inner side with a slotted metallic flange, $f$.

Into these is inserted the cross-bar $g$, one arm, $h$, of which extends some distance past the axle. Into the arm $h$, and on its lower side, a short distance forward of the axle, a shorter arm, $i$, is inserted, which arm extends downward, in front of and below the axle.

The axle is provided with an immovable lug, $n$, and with a movable notched collar, $o$, which has an arm, $k$, extending from it. Said collar may be thrown in or out of gear, with the lug $n$, by the motion of the lever $l$, on the top of the box D, said lever being connected with the collar by means of a bar, $m$, which is pivoted, by any suitable means, on the side of said box. This lever is held in position by friction on the top of the box.

When the collar $o$ is in gear with the lug $n$, and the machine moved forward, the axle-arm $k$ comes in contact with the cross-bar $h$ and the arm $i$, moving it and the slides H H, containing the corn, forward at the same time.

The slides, after having discharged their contents, are thrown back by a spiral, elliptic, or other spring, L, to be again charged with corn.

The collar $o$ may be provided with more than one arm, so as to make any number of hills required at each rotation of the axle.

Any number of grains may be deposited in a hill by adjusting the regulator $r$, as shown in fig. 4.

To the bearers, already mentioned as resting on the axle, the scrapers K are attached. These scrapers are adjusted by means of set-screws, and serve to cover the corn, &c.

In front of the middle rail C are two mortises, cut through the side rails to receive the sheath $d$ of the shovels I I, said shovels being also adjustable by means of the screws $e\ e$.

The boxes D D are constructed with a slanting bottom, inclining towards the front, where the bottom is open to allow the corn to fall into a hole in the slides, said holes being so arranged that, when the slides are moved forward, they will come just over the openings $c\ c$ in the blocks E.

By removing the boxes and scrapers, the planter becomes a cultivator.

The slides may also be operated by the driver, sitting on the seat O, between the boxes, by means of the foot-treadle N, which is arranged with an arm, so as to work on the cross-bar $g$.

P represents the tongue to which the team is hitched.

Having thus fully described our invention,

What we claim as new, and desire to secure by Letters Patent, is—

1. The movable notched collar $o$, provided with arm or arms $k$, in combination with the lug $n$ on the shaft $a$, when operated by means of one of the wheels M, which is firmly secured to said shaft, substantially as and for the purposes herein set forth.

2. The cross-bar $g$, provided with arms $h$ and $i$, in combination with the movable notched collar $o$ and arm $k$, for the purpose of moving the slides H H, substantially as herein set forth.

3. The lever $l$, arranged, as described, on top of the box D, in combination with the bar $m$ and movable notched collar $o$, for the purpose of throwing said collar in and out of gear with the lug $n$, substantially as and for the purposes herein set forth.

In testimony that we claim the foregoing, we have hereunto set our hands, this 11th day of June, 1868.

SNYDER FILSON.
WM. E. KINERT.

Witnesses:
J. V. GEARY,
A. W. LIVINGSTON.